US012771756B1

(12) United States Patent
Dorton

(10) Patent No.: US 12,771,756 B1
(45) Date of Patent: Oct. 20, 2026

(54) INTERACTIVE AUTHENTICATION AND NOTIFICATION PLATFORM

(71) Applicant: Pinpoint Targeting LLC, Wilmington, DE (US)

(72) Inventor: Patrick Dorton, Wilmington, DE (US)

(73) Assignee: Pinpoint Targeting LLC, Wilmington, DE (US)

( * ) Notice: Subject to any disclaimer, the term of this patent is extended or adjusted under 35 U.S.C. 154(b) by 0 days.

(21) Appl. No.: 19/297,316

(22) Filed: Aug. 12, 2025

Related U.S. Application Data

(63) Continuation of application No. 19/264,711, filed on Jul. 9, 2025, now abandoned.

(60) Provisional application No. 63/803,057, filed on May 9, 2025.

(51) Int. Cl.
*H04L 67/55* (2022.01)
*H04L 67/306* (2022.01)

(52) U.S. Cl.
CPC ............ *H04L 67/55* (2022.05); *H04L 67/306* (2013.01)

(58) Field of Classification Search
None
See application file for complete search history.

(56) References Cited

U.S. PATENT DOCUMENTS

| | | | | |
|---|---|---|---|---|
| 9,674,151 | B2 | 6/2017 | Turner et al. | |
| 10,185,738 | B1 * | 1/2019 | Jersin | G06F 16/2365 |
| 11,080,376 | B2 | 8/2021 | Modarresi | |
| 11,537,751 | B2 | 12/2022 | Al-Kabra et al. | |
| 11,978,089 | B2 | 5/2024 | Levy et al. | |
| 12,137,337 | B2 | 11/2024 | Mohan et al. | |
| 2003/0083938 | A1 * | 5/2003 | Smith | G06Q 30/02 705/14.66 |
| 2007/0118647 | A1 * | 5/2007 | Lee | G06Q 10/107 709/225 |
| 2010/0333178 | A1 | 12/2010 | Suthoff | |
| 2017/0142220 | A1 * | 5/2017 | Libow | H04L 67/306 |
| 2019/0122045 | A1 * | 4/2019 | Ravi | H04L 67/306 |
| 2024/0232827 | A9 | 7/2024 | Mulye et al. | |

FOREIGN PATENT DOCUMENTS

WO WO-2010116371 A1 * 10/2010 ............ G06Q 10/40

* cited by examiner

*Primary Examiner* — Lance Leonard Barry
(74) *Attorney, Agent, or Firm* — STEPTOE LLP; Scott M. Richey

(57) ABSTRACT

A method includes receiving a request to transmit a notification to a target entity. The request includes a non-unique identifier of the target entity corresponding to a unique entity. The method also includes generating a user profile associated with the target entity, updating the user profile with an alias of the target entity, determining a match rate value between the user profile for the target entity and the alias, and, in response to the match rate value exceeding a match rate threshold, enabling, by a data management platform, a determination of a device ID for the user profile. The method also includes enabling transmission of the notification to the device ID associated with the target entity, and prior to enabling transmission of the notification to the device ID, providing the notification to the notification platform without the device ID.

17 Claims, 11 Drawing Sheets

INTERACTIVE AUTHENTICATION AND NOTIFICATION PLATFORM

CROSS REFERENCE TO RELATED APPLICATIONS

This application claims the benefit of and priority to U.S. Patent Application No. 63/803,057, filed on May 9, 2025, the contents of which are incorporated herein by reference in their entirety.

BACKGROUND

Traditional notification systems may identify recipients of the notifications from pre-existing lists. For example, a company that wants to contact their previous customers can access a customer list and use information that was previously provided by their customer. The information may include their email address or phone number. The company may transmit the notification to the customer through identified communication channels, based on the information that was previously provided by the customer. In this example, the list of target entities for the notification (e.g., the company's customers) is limited to consumers that have a pre-existing relationship with the company and are included in the customer list, so that the contact information for these customers is provided on behalf of each previous customer.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

Figure 1:
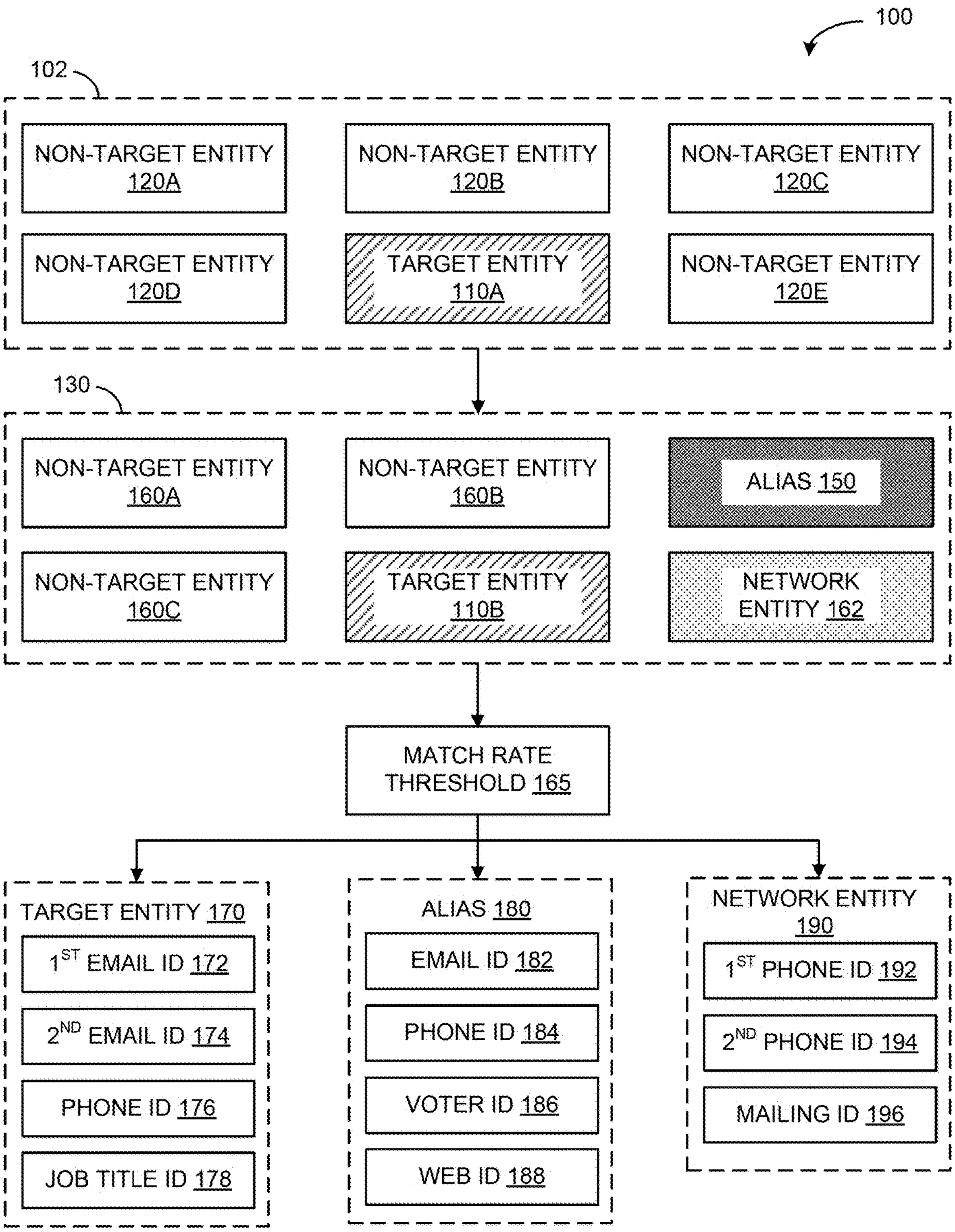
FIG. 1 illustrates a process for identifying a target entity, according to various aspects of the disclosed technology.

The figures are not exhaustive and do not limit the present disclosure to the precise form disclosed.

DETAILED DESCRIPTION

In other traditional examples, a company may want to contact new or potential customers as target entities. In this instance, the company may transmit the notification based on a target entity's physical location in a certain area at a certain time. The identification of the target entity may be unknown prior to the target entity being at the identified location. For example, while the potential customer is located at a building, the building may have a geotag and corresponding cellular base station. Based on geolocation of the potential customer's mobile device and the mobile device communicating with the cellular base station, the location of the customer may be inferred as being adjacent to the cellular base station and the corresponding building. When the potential customer accesses a notification platform, the company/platform may transmit the notification via the notification platform. In this example, the potential customer is identified based on a mobile device's physical location, often without much more information on the potential customer that receives the notification.

Examples of the disclosed technology provide a system, method, and computer-readable medium that provide interactive authentication and notification for a target entity. For example, a list of target entities may be received. In some examples, the list of target entities may only include generic, non-unique identifiers for the target entities and may not include contact information or unique identifiers (e.g., device ID, email ID, phone ID, voter ID, etc.). In some examples, the disclosed technology may communicate with various distributed platforms in view of receiving the list of target entities to help improve a match rate value for the target entity and ensure the intended/correct device is being contacted.

For example, the disclosed technology may communicate with an authentication platform that can supplement the generic, non-unique identifiers with unique identifiers from several of the distributed platforms unique identifiers (e.g., email ID, phone ID, address ID, voter ID, etc.). In some examples, the authentication platform may also identify an alias of the target entity or a related entity associated with the target entity that may be in the target entity's network ("network entity"). The authentication platform can return a supplemented list of unique identifiers for the target entity, any aliases of the target entity, and any network entities associated with the target entity.

The disclosed technology may provide the supplemented list of unique identifiers for the target entity to a data management platform. The data management platform may identify one or more device IDs for the target entity based on entries in the supplemented list of unique identifiers (e.g., email, phone, voter ID, etc.). In some examples, the data management platform may transmit the device IDs and supplemented list of unique identifiers for the target entity to a notification platform. The disclosed technology may generate a notification (e.g., text, static or motion images, audio, etc.) and transmit the notification to the notification platform, which can be matched to the device IDs. The notification may be transmitted via the notification platform to the device IDs.

Frequency of transmitting the notification(s) may vary by implementation. For example, the original source that provided the list of target entities may define a notification frequency (e.g., ten notifications sent per week). In some examples, the frequency of transmitting notifications may begin at a default value and can be adjusted based on various attributes (e.g., the effectiveness of the content, the cost efficiency of distributing the notification to the device IDs, etc.).

Determining the effectiveness of the notification may vary as well. For example, the notification platform may identify the engagement/interactions with the notification (e.g., via click stream analysis, click through rate, liking, commenting, or sharing on social media, etc.). In some examples, the effectiveness of the notification may be measured through a poll/survey that questions the target entity or others about viewing or interacting with the notification.

In response to the feedback regarding the effectiveness and frequency of the notification, the disclosed technology may iteratively adjust the notification process. For example, the notification process can be adjusted by increasing/decreasing frequency of transmissions of the notification, enhancing the data (e.g., by requesting additional data from the distributed platforms to identify additional aliases or device IDs for the target entity), adjusting the content of the notification, or other updates. In some examples, the iterative adjustments may include a first adjustment after a first notification is transmitted and feedback is received, then a second adjustment after a second notification is transmitted and feedback is received, and so on. In some examples, the adjustments to the notification process may be stopped in response to the feedback (e.g., the target entity acknowledges or communicates with a network entity based on receiving the notification).

Technical improvements are provided throughout the description. For example, traditional systems may transmit notifications to individuals that are not intended to receive the notification and unrelated to the target entity. The transmission of these notifications may waste the computing resources to process and transmit the notifications, including the computing resources that would be spent in accessing the contact information for these entities. On the user side, the users may receive notifications that may be stored on their device, thus wasting memory, processing capacity, and other computing resources related to the irrelevant notification. By improving the data within the notification process, the disclosed technology can preserve computational memory, processing capacity, and reduce irrelevant information that is transmitted between distributed systems, thus improving technology overall.

Implementations of the disclosed technology may also significantly improve data accuracy, consistency, and reliability through the implementation of the match rate threshold. For example, the system can supplement and improve data for the original target entity by communicating with various distributed platforms. In some examples, the original data for the target entities may be validated through these additional steps and help improve a match rate value for the target entity. In this way, the disclosed technology can help ensure the intended/correct device is being contacted and improving the data accuracy, which further improves traditional systems. Additional technical improvements may be apparent throughout the disclosure.

FIG. 1 illustrates a process for identifying a target entity, according to various aspects of the disclosed technology. In example 100, a set of entities 102 are available to contact via a notification. The set of entities 102 may include the target entity 110A and a set of non-target entities 120A, 120B, 120C, 120D, 120E (hereinafter "non-target entities 120"). The target entity 110A and non-target entities 120 in the set of entities 102 may only include generic, non-unique identifiers and may not include contact information or unique identifiers (e.g., email, phone, voter ID, etc.). The disclosed technology may create a user profile for each target entity 110A and non-target entities 120 to create a more complete view of the relevant information associated with each entity and add information to the user profile through an iterative process (e.g., via contacting external platforms to build the user profile with more information).

The user profile may also include a match rate value or confidence score that identifies the completeness of the user profile. The match rate value may be initially set to a default value between zero (e.g., empty user profile without information on the target entity) to one hundred (e.g., full user profile with all information stored/available), although other values are available without diverting from the essence of the disclosure. As additional information is added to the user profile through the iterative process, the match rate value may be increased.

To add information to the user profile, the disclosed technology may communicate with various distributed platforms in response to receiving the list of target entities. In some examples, one or more of the distributed platforms may be implemented by the disclosed technology without diverting from the essence of the disclosure (e.g., so that the disclosed technology can internally perform the functions of other platforms in the distributed platform, like the authentication platform, the data management platform, and the notification platform).

For example, the disclosed technology may communicate with an authentication platform that can supplement the generic, non-unique identifiers with potential, unique identifiers from several of the distributed platforms to create a set of unique entities 130. The set of unique entities 130 may include the target entity 110B and an alias 150 of the target entity. In some examples, alias 150 may correspond to the same user (e.g., "John Smith") but under a different non-unique identifier (e.g., "John A. Smith" or "Jonathan Smith") (e.g., as a disambiguation of similar names). In some examples, target entity 110B and alias 150 may be related based on a shared identifier/ID (e.g., a date of birth, a mailing address, or work history). In some examples, target entity 110B may be identified in multiple, different authentication platforms or data stores across the distributed network.

The target entity and the alias may be confirmed to relate to the same person. The confirmation may be based on a match rate value or confidence score that identifies the likelihood that the two user profiles are the same person. The match rate value may be initially set to a default value between zero (e.g., no data fields in common/matched) to one hundred (e.g., exactly the same data in both user profiles), although other values are available without diverting from the essence of the disclosure. When the match rate value between the target entity and the alias exceeds a match rate threshold, the user profiles for the target entity and the alias may be combined to a single user profile.

In some examples, the set of unique entities 130 may also comprise a network entity 162 of the target entity 110B. The network entity 162 may be associated with the target entity 110B in the target entity's network or otherwise in communication with the target entity 110B (e.g., in person, passive communication, or via devices). In some examples, the network entity 162 and the target entity 110B may be associated as connections on a social media network that is identified by the authentication platform (e.g., as an influencer connection or contact).

The confirmation of the connection between network entity 162 and target entity 110B may be based on a process of gathering public information (e.g., from social network platforms) with a same or similar identifiers. The data gathering process may generate a list of public-facing identifiers for each entity from the social network platform. In some examples, the identification of the network entity 162 and target entity 110B on the same public-facing page may be identified as a second match rate value exceeding a match rate threshold. In response to determining that the second match rate value exceeds a match rate threshold, the supplemental information on the page associated with each identifier can be added to the user profile created for the target entity 110B and network entity 162, respectively.

In some examples, the set of unique entities 130 may also comprise a non-target entities 160A, 160B, 160C (hereinafter "non-target entities 160") of the target entity 110B. The non-target entities 160 may be confirmed to be different users than the target entity 110B. The confirmation may be based on comparing unique identifiers from the authentication platform or other sources of information (e.g., public data stores) with the set of unique entities 130.

The authentication platform can return a supplemental list of unique identifiers for the target entity, aliases of the target entity, and network entities associated with the target entity. The information may be stored in the user profile for each entity.

As discussed, the process of gathering additional information and contacting the authentication platform may help increase the match rate value for the user profile of the target entity. In some examples, the match rate value may be compared with a match rate threshold 165. The match rate threshold 165 may correspond to a default value (e.g., 75%) or value associated with a user profile. In response to the match rate value exceeding the match rate threshold 165, the disclosed technology may transmit information for the target entity to determine a device ID and other contact information for that entity.

In some examples, the device ID and other contact information may be determined for the target entity 110B, alias 150, and network entity 162 by a data management platform that stores various IDs for each entity. The contact information may not be determined for the non-target entities 160 by a data management platform (e.g., to save computing resources in finding identifiers for irrelevant contacts). In some examples, the data management platform may include an internal identifier (e.g., RampID®) with a device ID that can be matched to the incoming device ID. The internal identifier of the data management platform may be appended to the incoming device ID and other contact information.

Various examples are provided and should be non-limiting to the description provided herein. For example, information from the user profile for target entity 110B may be transmitted to the data management platform and the data management platform can supplement/add additional contact information to the user profile 170, including a first email ID 172, second email ID 174, phone ID 176, and job title ID 178. In another example, information from the user profile for alias 150 may be transmitted to the data management platform and the data management platform can supplement/add additional contact information to the user profile 180, including email ID 182, phone ID 184, voter ID 186, and website ID 188. In another example, information from the user profile for network entity 162 may be transmitted to the data management platform and the data management platform can supplement/add additional contact information to the user profile 190, including first phone ID 192, second phone ID 194, and mailing address ID 196.

Figure 2:
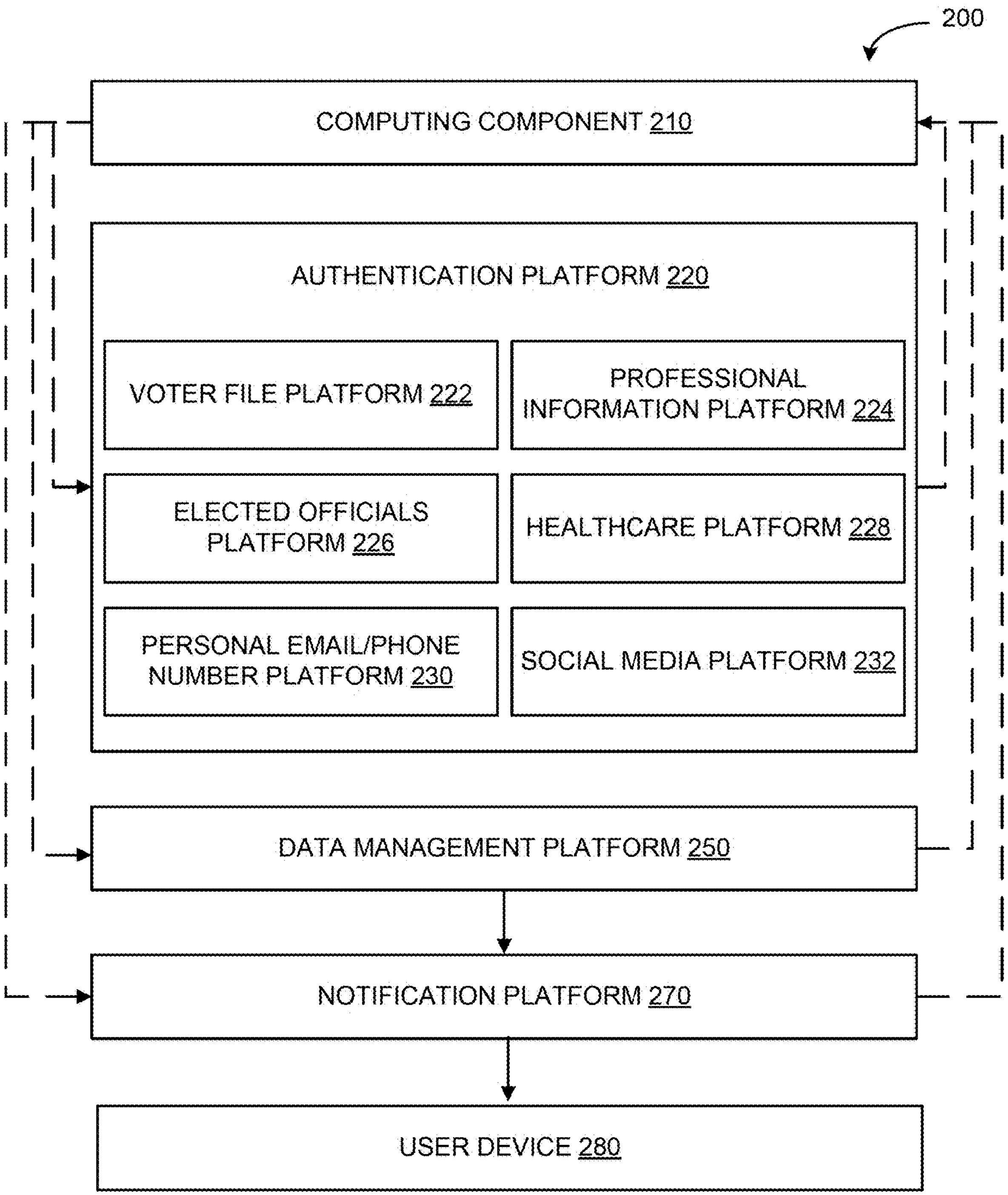
FIG. 2 illustrates a distributed system with a computing component, authentication platform, data management platform, notification platform, and user device, according to various aspects of the disclosed technology.

FIG. 2 illustrates a distributed system 200 with a computing component 210, authentication platform 220, data management platform 250, notification platform 270, and user device 280, according to various aspects of the disclosed technology. In the distributed system 200, the components/platforms may comprise communication modules to transmit and receive communications via a network.

Computing component 210 may be configured to receive a list of target entities. The list of target entities may only include generic, non-unique identifiers for the target entities and may not include contact information or unique identifiers (e.g., device ID, email ID, phone ID, voter ID, etc.). Computing component 210 may be configured to communicate with various distributed platforms in view of receiving the list of target entities.

Authentication platform 220 may be configured to supplement the generic, non-unique identifiers from computing component 210 with unique identifiers from several of the distributed platforms unique identifiers. The unique identifier may include a first name, last name, additional name(s), employer/company, job title, social media accounts (e.g., LinkedIn®, Twitter®/X®, etc.), work email, work phone number, work address, personal email, personal phone number, mailing/residential address, voter ID, personal website, date of birth, national provider identifier (NPI), IP address, or other information.

Various types of authentication platforms 220 are provided for illustrative purposes and should not be limiting to the features described herein. For example, voter file platform 222 may provide a voter ID for the target entity. Professional information platform 224 may provide work information including work phone, work address, work email for the target entity. Elected officials platform 226 may provide public information, including public email addresses and phone numbers/ID for the elected official's office. Healthcare platform 228 may provide healthcare information. Personal email/phone number platform 230 may provide personal information for the target entity, including its email address, phone number, or other similar information. Social media platform 232 may provide social media IDs or associated URLs for the target entity.

In some examples, the authentication platform may also identify an alias of the target entity or a related entity associated with the target entity that may be in the target entity's network ("network entity"). The authentication platform can return a supplemented list of unique identifiers for the target entity, any aliases of the target entity, and any network entities associated with the target entity.

Data management platform 250 may be configured to determine a device ID from the list of unique identifiers from computing component 210 or supplemented list of unique identifiers from authentication platform 220. In some examples, data management platform 250 can provide additional data to supplement the identifiers received and create a single, consistent view of the target entity.

In some examples, computing component 210 is configured to transmit the information for the target entity, absent the device IDs, to the data management platform 250. Data management platform 250 may review the data from computing component 210 and add a device ID. In some examples, the data management platform 250 may subsequently remove the information that it received from computing component 210 and generate a list of only the device IDs. The list of device IDs may be transmitted to the notification platform 270.

Notification platform 270 may be configured to receive a notification from computing component 210. In some examples, computing component 210 may transmit the notification as a hash value, encrypted file, or other protected format that can be decoded by notification platform 270 upon receipt.

In some examples, the notification may comprise a set of notifications where the text from the notification may be generated as multiple notifications in different sizes, colors, or other formatting features, as described herein. The formatting features may be generated based on specifications for notification platform 270. Notification platform 270 may identify the notification that aligns with the formatting required for publication via its technology/protocol. For example, a notification from computing component 210 may correspond to the publication requirements of notification platform 270, absent additional formatting from notification platform 270. In this sense, notification platform 270 can provide the particular notification to the device ID or target entity.

User device 280 may be configured to access the notification platform 270 to receive the notification. In some examples, user device 280 may accept push notifications from notification platform 270 as well.

Figure 3:
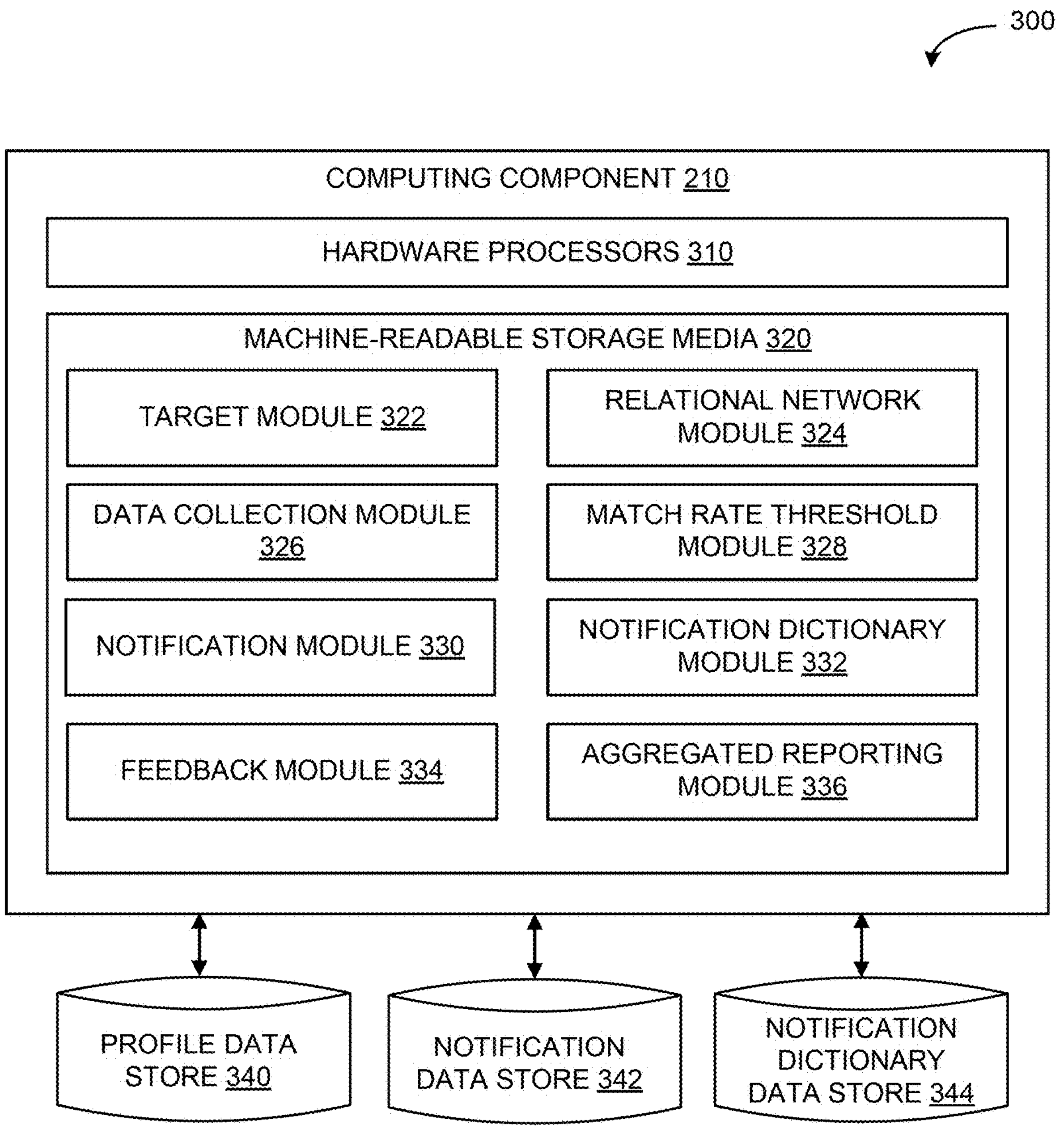
FIG. 3 illustrates a computing component illustrated in FIG. 2, according to various aspects of the disclosed technology.

FIG. 3 illustrates computing component 210 illustrated in FIG. 2, according to various aspects of the disclosed technology. In example 300, computing component 210 may comprise a server, a cloud computing device, a handheld communication device, a laptop-type computer, or other computing component. In the example implementation of FIG. 3, computing component 210 includes hardware processor 310 and machine-readable storage medium 320. Although computing component 210 is shown to include hardware processor 310 and machine-readable storage medium 320, any of components illustrated in FIG. 2 can include these features.

Hardware processor 310 may be one or more central processing units (CPUs), semiconductor-based microprocessors, and/or other hardware devices suitable for retrieval and execution of instructions stored in machine-readable storage medium 320. Hardware processor 310 may fetch, decode, and execute instructions to control processes or operations for implementing an interactive authentication and notification platform. As an alternative or in addition to retrieving and executing instructions, hardware processor 310 may include one or more electronic circuits that include electronic components for performing the functionality of one or more instructions, such as a field programmable gate array (FPGA), application specific integrated circuit (ASIC), or other electronic circuits.

Machine-readable storage medium 320 may be any electronic, magnetic, optical, or other physical storage device that contains or stores executable instructions. Thus, machine-readable storage medium 320 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 320 may be a non-transitory storage medium, where the term "non-transitory" does not encompass transitory propagating signals.

Machine-readable storage medium 320 may also comprise various engines or other logic embodied in hardware, firmware, or software instructions. These engines may be configured for execution by hardware processor 310 using the instructions embodied in each engine, including target module 322, relational network module 324, data collection module 326, match rate threshold module 328, notification module 330, notification dictionary module 332, feedback module 334, and aggregated reporting module 336. Various data may be accessed and stored from these components as well, including at profile data store 340, notification data store 342, and notification dictionary data store 344.

Target module 322 is configured to receive a list of target entities. The list of target entities may only include generic, non-unique identifiers for the target entities and may not include contact information or unique identifiers (e.g., device ID, email ID, phone ID, voter ID, etc.). In some examples, the target entity is identified from a segment, including individuals based on job title or role, a congressional committee, a political party or affiliation, company or industry, or group membership.

Relational network module 324 is configured to determine relationships between the target entity and other entities. The other entities may be aliases of the target entity (e.g., referring to the same individual/entity), network entity (e.g., referring to an individual/entity in communication with the target entity), or non-target entity. Relational network module 324 may determine unique identifiers (e.g., email ID, phone ID, address ID, voter ID, etc.) for any aliases or network entities of the target entity by sending the unique identifier to an authentication platform.

Data collection module 326 is configured to receive a unique identifier from the authentication platform to help supplement the information on the target entity. In some examples, data collection module 326 may communicate with various distributed platforms in view of receiving the list of target entities. For example, the disclosed technology may communicate with an authentication platform that can supplement the generic, non-unique identifiers with unique identifiers from several of the distributed platforms unique identifiers (e.g., email ID, phone ID, address ID, voter ID, etc.). In some examples, the authentication platform may also identify an alias of the target entity or a related entity associated with the target entity that may be in the target entity's network ("network entity"). The authentication platform can return a supplemented list of unique identifiers for the target entity, any aliases of the target entity, and any network entities associated with the target entity.

Match rate threshold module 328 is configured to determine a match rate of a user profile corresponding to the target entity, alias entity (interchangeable with "alias"), or the network entity. For example, the user profile may include a match rate or confidence score that identifies the completeness of the user profile. The match rate may be initially set to a default value between zero (e.g., empty user profile without information on the target entity) to one hundred (e.g., full user profile with all information stored/available), although other values are available without diverting from the essence of the disclosure. In other examples, a match rate may also be determined to compare a target entity with an alias entity, or to compare a target entity with a network entity.

Match rate threshold module 328 is also configured to compare the match rate value to a match rate threshold. When the match rate value that determines the likelihood that two user profiles are the same entity, the match rate that exceeds the match rate threshold may activate a process to combine the user profiles into identify a single profile/entity. When the match rate value that determines the likelihood that a network entity is associated with a target entity, the match rate that exceeds the match rate threshold may activate a process to add the device IDs from each entity to the list of device IDs that should receive the notification from the notification platform.

Notification module 330 is configured to generate a notification. The notification may comprise various formats and sizes. For example, the notification may correspond to a mix of video, HTML-5, moving GIF notification, and display notifications. The size of the notifications may correspond to 320×50, 300×250, 728×90, 300×600, 480×320, 320×480, 160×600, 970×250, 970×90, or other values. The length of the video/moving notification may comprise 15 seconds, 30 seconds, or some other value.

In some examples, the text from the notification may be generated as multiple notifications in different sizes, colors, or other formatting features. The formatting features may be generated based on specifications for the notification platform. In some examples, the notification may be generated with significantly similar text or similarly-themed formatting features. In some examples, the notification may be generated using a notification dictionary that matches the target entity (generated by notification dictionary module 332).

Notification dictionary module 332 is configured to identify content that may be published by the target entity. The content may comprise news publications, white papers, articles, and other sources of information taken from content that the target entity has published and made available. Notification dictionary module 332 may use the content provided by the target entity to generate the notification using the words/phrases from the publication.

Notification dictionary module 332 is also configured to identify terms for the target entity that align with a background/attribute of the target entity from the user profile (e.g., jargon for the area of expertise or familiarity of the target entity). As an illustrative example, when the target entity is a medical doctor, the notification dictionary for the target entity may be associated with medical terms.

Feedback module 334 is configured to determine interaction metrics associated with the notification on the notification platform (e.g., notification platform 270 in FIG. 2). In some examples, the notification platform may transmit the interaction metrics to feedback module 334.

In some examples, feedback module 334 may receive information on the number of device IDs or entities that received the notification. The audience size may affect the notification platform that receives the notification to distribute. For example, if the audience size exceeds one-hundred people matched, notification module 330 can transmit the notification to a first notification platform (e.g., Meta®) and if the audience size exceeds three-hundred people matched, notification module 330 can transmit the notification to a second notification platform (e.g., LinkedIn®).

Aggregated reporting module 336 is configured to aggregate data across the data stores to help determine audience reach (e.g., aggregated by target entity), frequency, and engagement/feedback. For example, the reporting may comprise a message and notification performance by audience and platform, media performance by audience and platform, branded versus unbranded creative performance, creative A/B testing results, online message testing results, top domains audience engaged, brand lift studies, sales lift studies, audience engagement, audience reach by frequency, audience demographic insights, performance by notification platform, audience media consumption insights, or any strategic communication recommendations.

Figure 4:
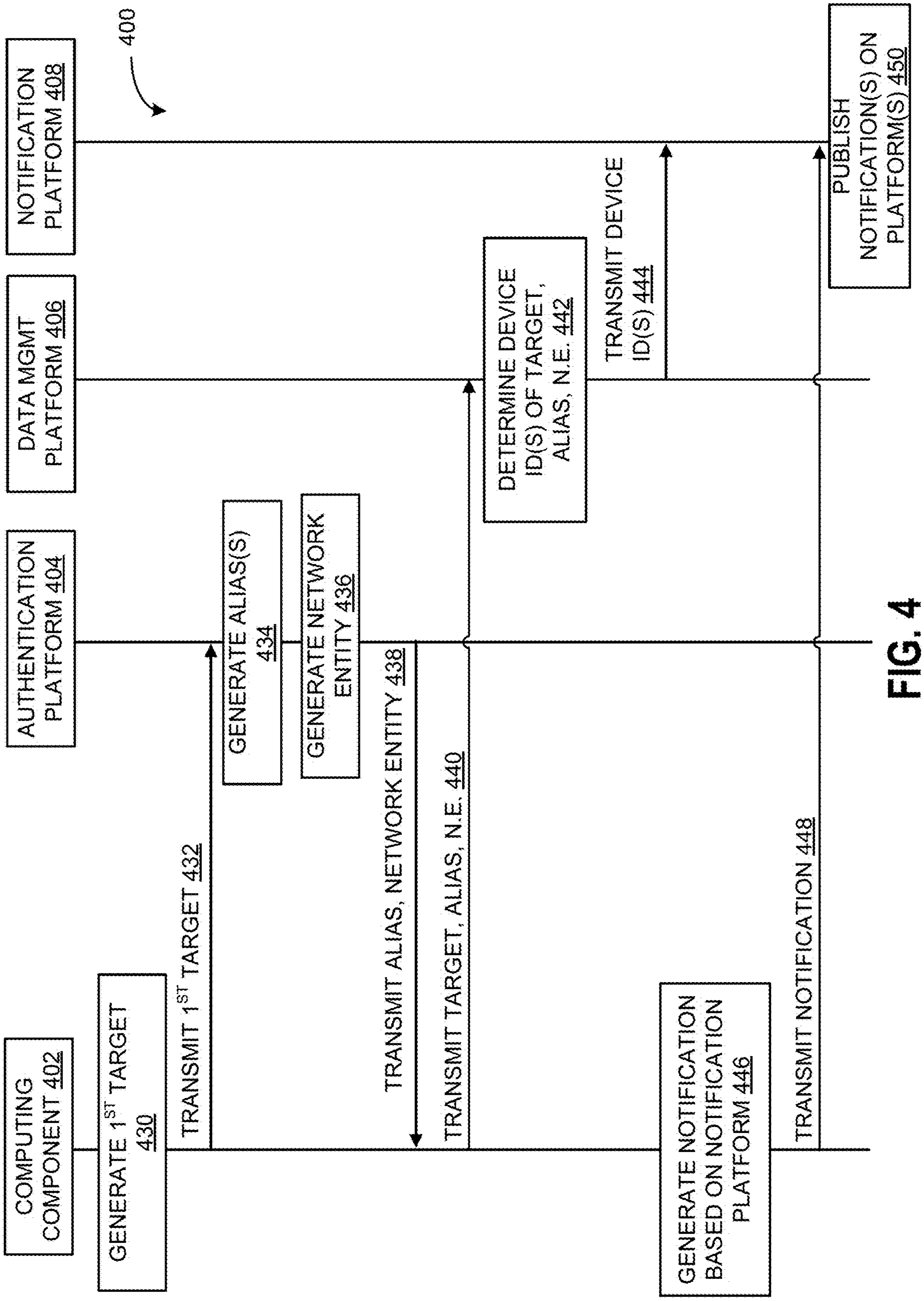
FIG. 4 illustrates a process for identifying a target entity, according to various aspects of the disclosed technology.

FIG. 4 illustrates a process for identifying a target entity, according to various aspects of the disclosed technology. In example 400, computing component 402, authentication platform 404, data management platform 406, and notification platform 408 are provided, according to various aspects of the disclosed technology. In this example, computing component 402, authentication platform 404, data management platform 406, and notification platform 408 in FIG. 4 may correspond to computing component 210, authentication platform 220, data management platform 250, and notification platform 270 in FIG. 2, respectively.

At block 430, computing component 402 may generate a target entity or a list of target entities as generic, non-unique identifiers in response to receiving a request to transmit a notification to the target entity. The target entity may also correspond to a user profile maintained by computing component 402. In some examples, computing component 402 may receive a target entity or a list of target entities from a separate entity.

In some examples, the target entity may be identified in a request from a user device. The request may be received from a user device that intends to transmit the notification to the target entity and may not be able to identify the device ID or other contact information for the target entity. In some examples, the request may comprise a non-unique identifier of the target entity (e.g., a general name of an individual) and the target entity may correspond to a unique entity (e.g., a specific individual).

At block 432, computing component 402 may transmit the target entity to an authentication platform 404. Various information may be transmitted to the authentication platform 404 about the target entity, including non-unique identifiers for the target entity that may not include contact information or unique identifiers information (e.g., email, phone, voter ID, etc.).

In some examples, computing component 402 may communicate with various authentication platforms 404 that can supplement the generic, non-unique identifiers with unique identifiers from several of the distributed platforms unique identifiers (e.g., email ID, phone ID, address ID, voter ID, etc.). For example, authentication platform 404 may comprise a voter file platform to provide a voter ID for the target entity, a professional information platform to provide work information for the target entity, an elected official platform to provide public information for the target entity, a healthcare platform to provide healthcare information, a personal email/phone number platform to provide personal information for the target entity, a social media platform to provide social media IDs or associated URLs for the target entity, or other platform that can provide additional information to supplement a user profile.

At block 434, authentication platform 404 may generate an alias entity for the target entity. For example, in response to identifying user profiles that match the non-unique identifiers for the target entity, authentication platform 404 may determine an alias that may likely match the intended recipient of the notification identified in the initial request.

At block 436, authentication platform 404 may generate a network entity for the target entity or the alias entity. For example, in response to identifying user profiles that match the non-unique identifiers for the target entity, authentication platform 404 may determine a network entity for the target entity or the alias (from block 434) that may likely match the entities that are in contact with the target entity. This may help identify the network entity of the intended recipient of the notification identified in the initial request.

At block 438, authentication platform 404 may transmit the supplemented list of unique identifiers for the target entity, any aliases of the target entity, and any network entities associated with the target entity back to computing component 402.

In some examples, the supplemented list of unique identifiers may be matched to the target entity, aliases, and network entities. For example, in determining the match rate value between the target entity and the alias, the matching process may determine whether they are directed to the same individual. The match rate value or confidence score may be initially set to a default value between zero (e.g., not the same person) to one hundred (e.g., definitely the same person), although other values are available without diverting from the essence of the disclosure. As additional information is matched between the between the target entity and the alias (e.g., using fuzzy matching or embedding/similarity determination), the match rate value may be increased.

In determining the match rate value between the target entity/alias and the network entity, the matching process may determine whether the target entity/alias and the network entity are directed to individuals that may communicate with each other. The match rate value or confidence score may be initially set to a default value between zero (e.g., no communication) to one hundred (e.g., communication), although other values are available without diverting from the essence of the disclosure. As additional information is matched between the between the target entity/alias and the network entity (e.g., using fuzzy matching or embedding/similarity determination between job data, city/state data, etc.), the match rate value may be increased.

At block 440, computing component 402 may transmit the supplemented list of unique identifiers for the target entity to data management platform 406. In some examples, the information may include unique identifiers that were identified by authentication platform 404 as likely being related to the same person (e.g., target entity and alia) or likely being in contact with the target entity (e.g., network entity).

At block 442, data management platform 406 may determine device IDs for the target entity based on entries in the supplemented list of unique identifiers (e.g., email, phone, voter ID, etc.). In some examples, data management platform 406 may include an internal identifier (e.g., RampID®) with a device ID that can be matched to the supplemented list of unique identifiers. The internal identifier of data management platform 406 may be appended to the list.

In some examples, device IDs may be identified for the target entity, any aliases of the target entity, and any network entities associated with the target entity. Various device IDs may be used without limitation. For example, contact information for the target entity may include an email ID, phone ID, website ID, mailing address ID, social media ID, or other information discussed herein.

At block 444, data management platform 406 may transmit the device IDs to notification platform 408. Data management platform 406 may store the device IDs in a profile associated with the target entity.

At block 446, computing component 402 may generate the notification (e.g., text, static or motion images, audio, etc.) based on the formatting/publication requirements from notification platform 408. For example, the notification may correspond to a mix of video, HTML-5, moving GIF notification, and display notifications. The size of the notifications may correspond to 320×50, 300×250, 728×90, 300×600, 480×320, 320×480, 160×600, 970×250, 970×90, or other values. The length of the video/moving notification may comprise 15 seconds, 30 seconds, or some other value. In some examples, the terms in the notification for the target entity may align with a background/attribute of the target entity from the user profile (e.g., jargon for the area of expertise or familiarity of the target entity).

At block 448, computing component 402 may transmit the notification to the notification platform 408, which can be matched to the device IDs that were previously stored at block 444. For example, the notification may be transmitted as a hash value, encrypted file, or other protected format that can be decoded by notification platform 408.

At block 450, notification platform 408 may provide/publish the notification (from computing component 402) to the device ID (from data management platform 406). In some examples, feedback may be received to adjust/reconfigure the notification in subsequent publications as well.

Figure 5:
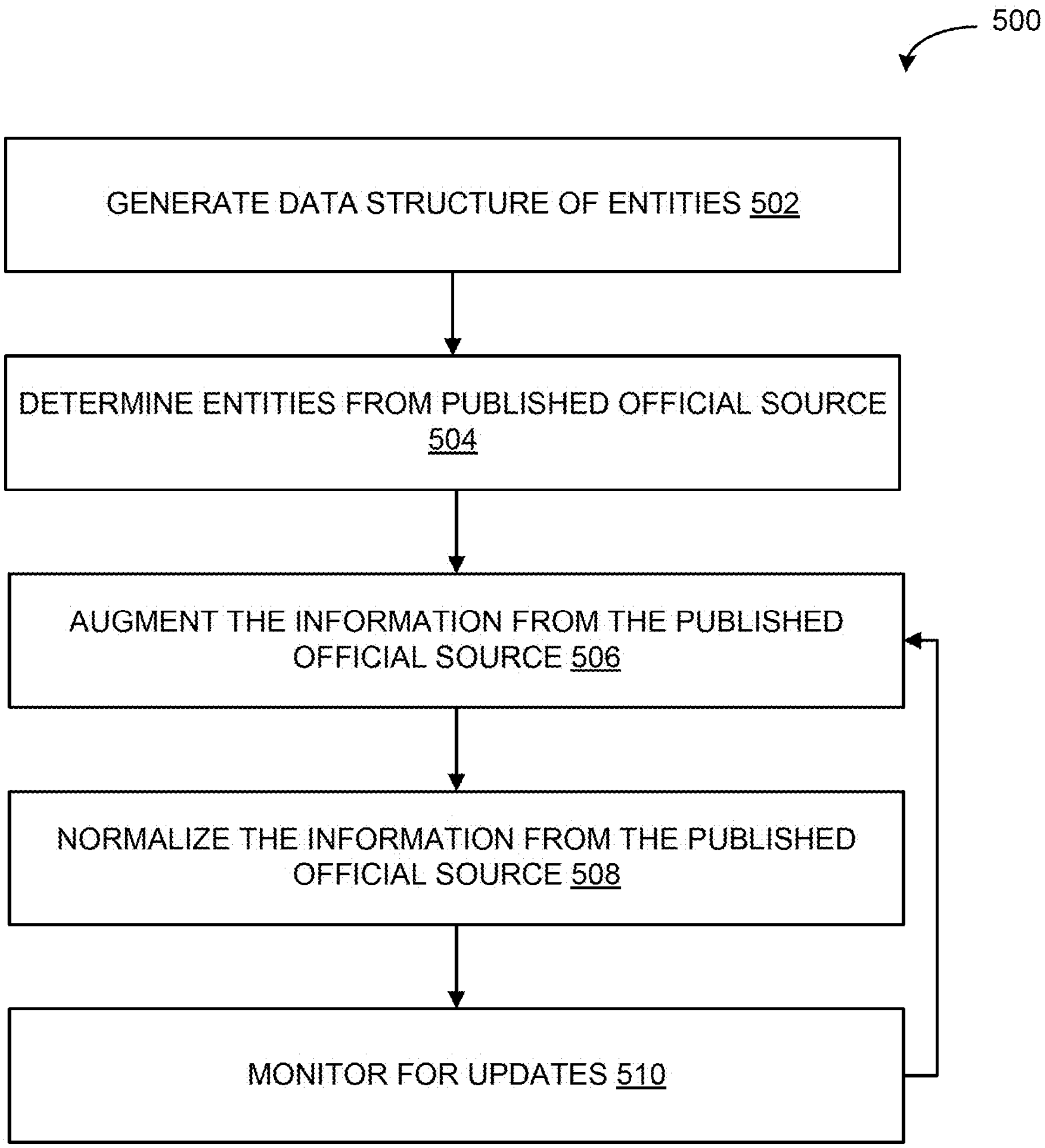
FIG. 5 illustrates a process for identifying target entities, according to various aspects of the disclosed technology.

FIG. 5 illustrates a process for identifying target entities, according to various aspects of the disclosed technology. Method 500 may be implemented by computing component 210, authentication platform 220, data management platform 250, or notification platform 270 in FIG. 2, or other components described throughout the disclosure.

At block 502, method 500 may maintain/update a data stores of entities, including unique or non-unique identifiers. In some examples, the data store may comprise a relational database, structured data format, or other data structure.

At block 504, method 500 may determine entities from published official sources. For example, a published official source may include an official company website that lists the names of the chief executive officer (CEO), chief technology officer (CTO), investor, or other decision maker. In another example, the published official source may include a government website that lists the names of an elected official (e.g., senator, representative, governor, mayor, councilmember, etc.), chief of staff, or other decision maker. Other sources may include, without limitation, Congress, the Federal Government, state and local governments, news media, firms, corporations, non-profit companies, and other associations.

The identifiers may correspond to various information. For example, the publicly available information may include a name (e.g., "John A. Smith" or "Jonathan Smith"), a mailing address, work history, or other information that is provided to the public about public officials and other entities. In other examples, the information may include the name, employer, job title, email address, LinkedIn® profile, and additional data points. The information may be provided via the published official source.

The website may be "official" based on a variety of factors. For example, the website may use a Top-Level Domain (TLD) (e.g., *.com, *.org, *.gov, etc.) and properly spell the name of the official entity (e.g., "Acme Company" instead of "AAcme Company"). In some examples, a search engine (e.g., Google®, Bing®, etc.) may list the published official source in search results above non-official sources. In some examples, a social media account (e.g., LinkedIn®, Instagram®, etc.) may list the published official source in search results above non-official sources or include a verified/confirmed identity logo.

At block 506, method 500 may augment the information on entities in the data store from the published official source. For example, the published official source may include historical actions performed by the entity, including information related to conducting official actions or attending official events where the entities in attendance may be identified in the publication. The entities listed in the article about the official actions may be related to the entity (e.g., as staff organizational data). In some examples, the location of the official action may be related to the entity (e.g., building addresses, email ID, phone ID, etc.). Any of this information may be used to augment the data store.

At block 508, method 500 may normalize the information in the data store. For example, jsoup, Fast HTML Parser™, or other parser can initiate a text normalization process to remove line breaks or additional spacing. The normalization may generate a "mailto contact" link for the entity names in the published official source or add an official office to the data store.

At block 510, method 500 may monitor the published official source for new information that can be added to the data store. The new information may include, without limitation, a new hire or other entity that has been added or removed from the official company website, government website, or other published official source. The information may be added as a connection/contributor to the existing entity in the data store or added as a new entity with new information.

In some examples, method 500 may return to block 506 to augment the data store with the new information from the published official source. Method 500 may be iteratively repeated to maintain accurate and up-to-date information.

Figure 6:
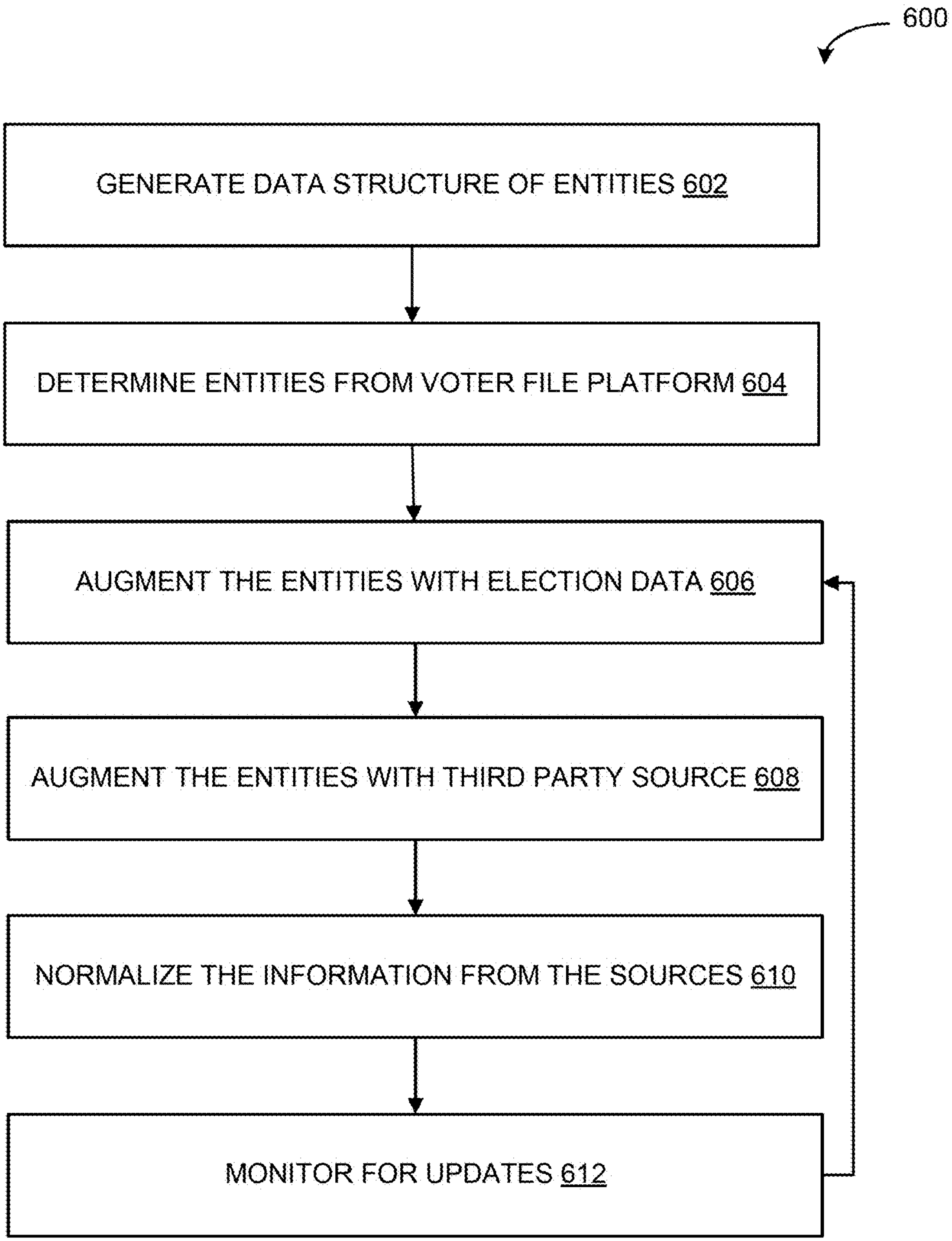
FIG. 6 illustrates a process for identifying target entities, according to various aspects of the disclosed technology.

FIG. 6 illustrates a process for identifying target entities, according to various aspects of the disclosed technology. Method 600 may be implemented by computing component 210, authentication platform 220, data management platform 250, or notification platform 270 in FIG. 2, or other components described throughout the disclosure.

At block 602, method 600 may maintain/update a data store of entities, including unique or non-unique identifiers. In some examples, the data store may comprise a relational database, structured data format, or other data store.

At block 604, method 600 may determine entities from a voter file platform. For example, the voter file platform may comprise a publicly-available voter file, voter registration list, voter roll, or other data store that contains information about registered voters in a jurisdiction. The information may comprise, without limitation, a full name, address of residence, mailing address, date of birth, gender, party affiliation, voting history, whether the entity voted in past elections, voter registration date, voter ID number, phone number, email address, precinct or district information, method of voting (e.g., in-person, absentee), registration status (e.g., active, inactive), or other information. The voter file platform may be maintained by an election official.

At block 606, method 600 may augment a user profile associated with the entities in election data. For example, the election data may comprise vote counts for each candidate/party in a precinct, county, or state, turnout rates, voter participation data (e.g., how many people are registered, how many voted, breakdowns by age, party affiliation, etc.), or other information related to an election. This information can be matched, in the aggregate, to the voter file platform to help supplement the information about entities in a particular area.

At block 608, method 600 may augment a user profile associated with the entities in third party source data. For example, the third party source data may comprise public voter rolls that are enhanced with consumer data (e.g., shopping habits, income estimates, online behavior and cookie tracking, digital footprints, or other information). This information can be matched to the voter file platform to help supplement the information about the particular target entity.

At block 610, method 600 may normalize the information in the data store. For example, jsoup, Fast HTML Parser™, or other parser can initiate a text normalization process to remove line breaks or additional spacing. The normalization may generate a "mailto contact" link for the entity names in the voter file platform or other sources.

At block 612, method 600 may monitor the voter file platform, election data source, and third party source for new information that can be added to the data store. The new information may include, without limitation, a new registered voter that has been added from the voter file platform or other sources. The information may be added as a connection/contributor to the existing entity in the data store or added as a new entity with new information.

In some examples, method 600 may return to block 606 to augment the data store with the new information from the voter file platform, election data source, and third party source. Method 600 may be iteratively repeated to maintain accurate and up-to-date information.

Figure 7:
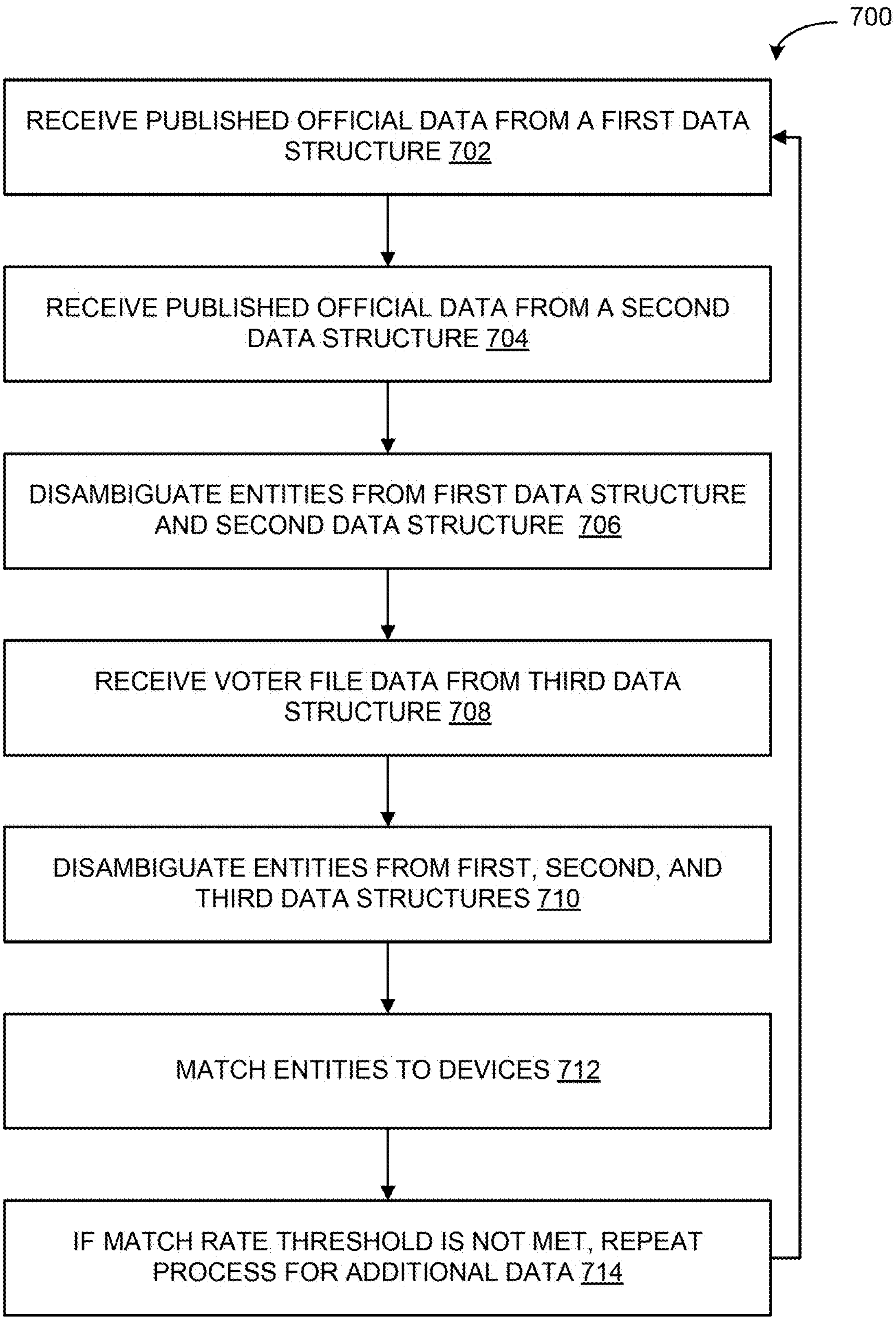
FIG. 7 illustrates a process for matching an alias with a target, according to various aspects of the disclosed technology.

FIG. 7 illustrates a process for matching an alias with a target, according to various aspects of the disclosed technology. Method 700 may be implemented by computing component 210, authentication platform 220, data management platform 250, or notification platform 270 in FIG. 2, or other components described throughout the disclosure.

At block 702, method 700 may receive published official data from a first data store. As an illustrative example, the data may comprise a job title, employer, work address, work phone number, work email, predicted email, LinkedIn® account, Meta®/Facebook® account, Twitter®/X® account, or other information.

At block 704, method 700 may receive published official data from a second data store. As an illustrative example, the data may comprise a personal email, prior work email(s), cell phone number, home phone number, prior work phone number(s), city, state, or other information. This information may be included with a user profile for the target entity. In some examples, the user profile may also include a match rate value or confidence score that identifies the completeness of the user profile.

At block 706, method 700 may disambiguate entities from the first data store and the second data store. As an illustrative example, the disambiguation process may disambiguate data between the first data store (block 702) and the second data store (block 704) by using data points available in both databases. The disambiguated data may comprise, without limitation, name, job title, employer, and LinkedIn® account.

As information is disambiguated, the match rate value may be adjusted through an iterative process. For example, as discussed herein, the match rate value may initially be set to a default value between zero (e.g., empty user profile without information on the target entity) to one hundred (e.g., full user profile with all information stored/available), although other values are available without diverting from the essence of the disclosure. As additional information is added to the user profile, the match rate value may be increased.

In some examples, the match rate value may be compared to the match rate threshold. If the match rate threshold is met (e.g., at least 75%), method 700 may match the entities to devices or device IDs and transmit a notification to these devices, as described herein. In some examples, if the match rate threshold is not met, method 700 may proceed to block 708.

At block 708, method 700 may receive voter file data from the voter file platform, election data, and third party data from a third data store. The information may comprise, without limitation, a full name, address of residence, mailing address, date of birth, gender, party affiliation, voting history, whether the entity voted in past elections, voter registration date, voter ID number, phone number, email address, precinct or district information, method of voting (e.g., in-person, absentee), registration status (e.g., active, inactive), or other information. The voter file platform may be maintained by an election official.

At block 710, method 700 may disambiguate entities from the first data store, the second data store, and the third data store. As an illustrative example, the disambiguation process may disambiguate data between the combined first and second data stores and the third data store (block 708) by using data points available in both databases. In some examples, data from the combined first and second data stores may be identified as an alias to match with the data in the third data store. The disambiguated data may comprise, without limitation, a name, mailing address, additional phone numbers, and additional email addresses.

At block 712, method 700 may match entities to devices or device IDs. For example, the user profile may be matched to one or more device IDs for the target entity (e.g., email, phone, voter ID, etc.). In some examples, the data management platform may provide the device IDs to the computing component or may provide the device IDs to a notification platform.

At block 714, method 700 may repeat 702-712 if the match rate threshold is not met (e.g., at least 75%). Method 700 may be repeated until the match rate exceeds the match rate threshold.

Figure 8:
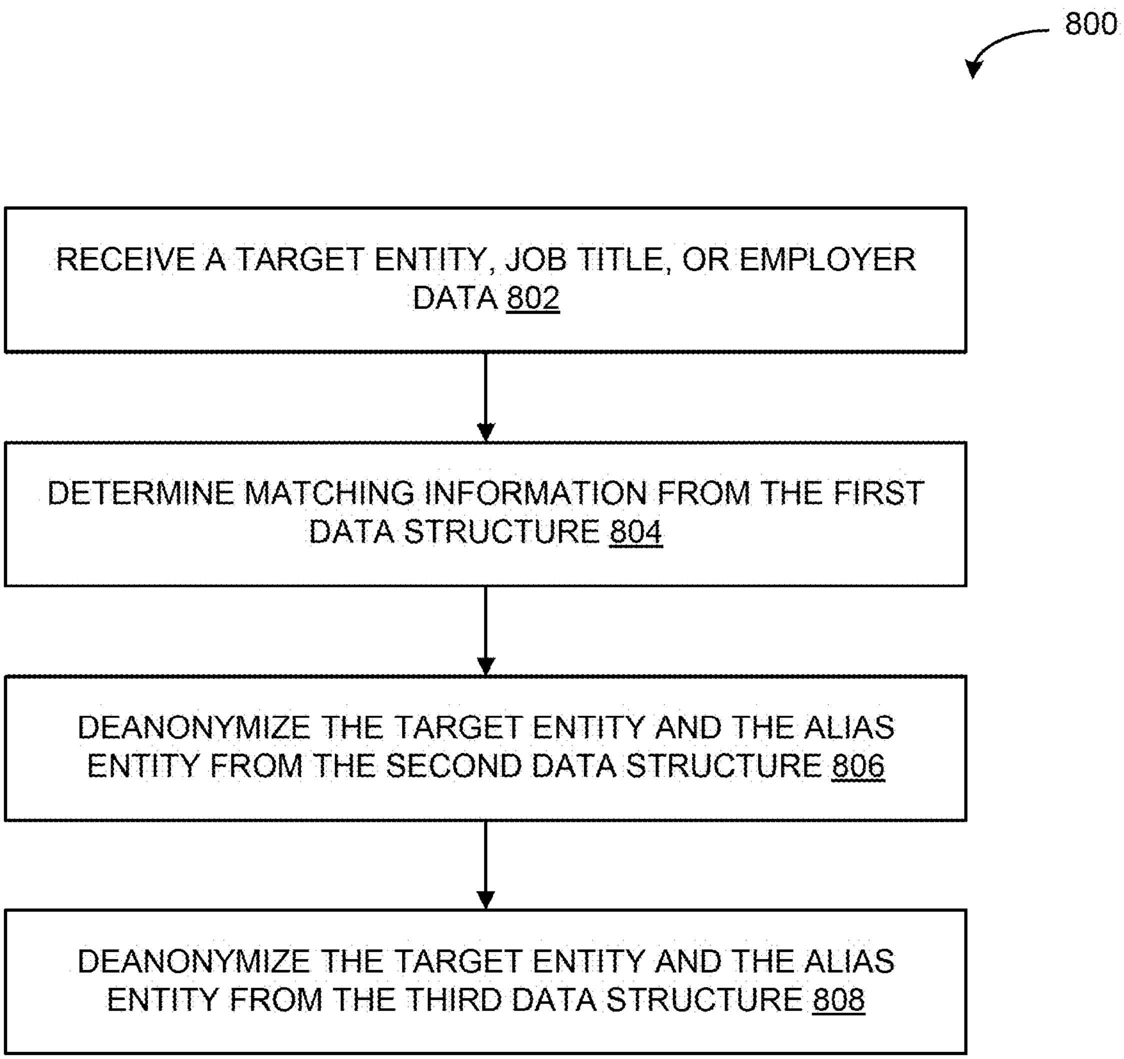
FIG. 8 illustrates a process for matching an alias with a target, according to various aspects of the disclosed technology.

FIG. 8 illustrates a process for matching an alias with a target, according to various aspects of the disclosed technology. Method 800 may be implemented by computing component 210, authentication platform 220, data management platform 250, or notification platform 270 in FIG. 2, or other components described throughout the disclosure.

At block 802, method 800 may receive a target entity from a user device. The request may include a non-unique identifier of the target entity or other information (e.g., a job title or role, employer data, or other information to help generally identify the individual that the user device intends to contact via the notification. In some examples, the user device may not be able to identify the device ID or other contact information for the target entity in the initial request.

At block 804, method 800 may determine matching information in the first data store. For example, the target entity, job title, or employer data may be matched to published official data from the first data store. In some examples, the target entity, job title, work address, work phone number, work email, predicted email, LinkedIn® account, Meta®/Facebook® account, Twitter®/X® account, or other information may be provided for matching.

At block 806, method 800 may deanonymize the data identified from the first data store using the published official data from a second data store. When the name for a first target entity does not match the name for second target entity, yet other information matches, the second target entity may be identified as an alias of the first target entity. For example, the job title, employer data, work address, work phone number, work email, predicted email, LinkedIn® account, Meta®/Facebook® account, Twitter®/X® account, personal email, prior work email(s), cell phone number, home phone number, prior work phone number(s), city, state, or other information may be provided for deanonymizing.

At block 808, method 800 may deanonymize the data identified from the first data store using the voter data from a third data store. When the name for a first target entity does not match the name for third target entity, yet other information matches, the third target entity may be identified as an alias of the first target entity. For example, the date of birth, mailing address, additional phone numbers, additional email addresses, or other information may be provided for deanonymizing.

Figure 9:
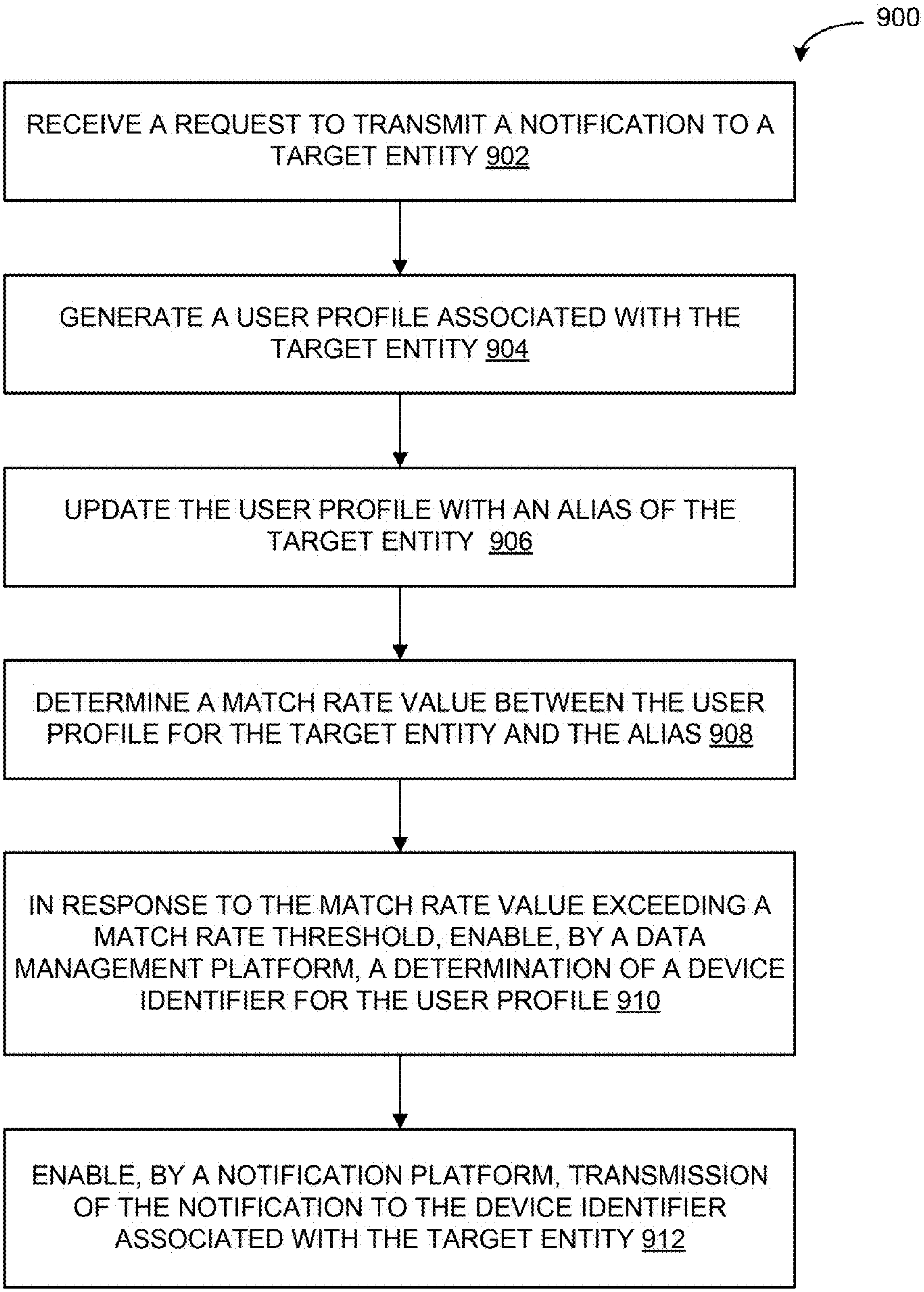
FIG. 9 illustrates a process performed by the computing component described herein, according to various aspects of the disclosed technology.

FIG. 9 illustrates a process for matching an alias with a target, according to various aspects of the disclosed technology. Method 900 may be implemented by computing component 210, authentication platform 220, data management platform 250, or notification platform 270 in FIG. 2, or other components described throughout the disclosure.

At block 902, method 900 may receive a request to transmit a notification to a target entity. The request may comprise a non-unique identifier of the target entity and the target entity may correspond to a unique entity.

At block 904, method 900 may generate a user profile associated with the target entity. The user profile may be stored in a data store and help create a more complete view of the relevant information associated with the target entity. Information may be added to the user profile through an iterative process (e.g., via contacting external platforms to build the user profile with more information and determining a match rate value associated with the likely matches between different user profiles).

At block 906, method 900 may update the user profile with an alias of the target entity. For example, method 900 may communicate with an authentication platform that can supplement the generic, non-unique identifier in the request with additional information from a second user profile (e.g., corresponding to a potential alias of the target entity). In some examples, the authentication platform may provide several potential aliases that can be determined to match the target entity (e.g., using fuzzy matching or embedding/similarity determination).

At block 908, method 900 may determine a match rate value between the user profile for the target entity and the alias. For example, in determining the match rate value between the target entity and the alias, a matching process may determine whether they are directed to the same individual. The match rate value or confidence score may be initially set to a default value between zero (e.g., not the same person) to one hundred (e.g., definitely the same person). As additional information is matched between the between the target entity and the alias (e.g., using fuzzy matching or embedding/similarity determination), the match rate value may be increased. As an illustrative example, the target entity and the alias may be related based on a shared identifier/ID (e.g., a date of birth, a mailing address, or work history) which can increase the match rate value between the two user profiles.

In some examples, method 900 may also determine whether a network entity is related to a target entity/alias using a matching process. In determining the match rate value between the target entity/alias and the network entity, the matching process may determine whether the target entity/alias and the network entity are directed to individuals that may communicate with each other (e.g., listed on a same public-facing page or published official source, social network, employment/job data, etc.). The match rate value or confidence score may be initially set to a default value between zero (e.g., no communication) to one hundred (e.g., communication). As additional information is matched between the between the target entity/alias and the network entity (e.g., using fuzzy matching or embedding/similarity determination between job data, city/state data, etc.), the match rate value may be increased.

At block 910, method 900 may enable, by a data management platform, a determination of a device identifier for the user profile. For example, the match rate value may be compared with a match rate threshold and, in response to the match rate value exceeding a match rate threshold, method 900 may enable the determination of a device identifier for the user profile or other contact information for that entity. The match rate threshold may correspond to a default value (e.g., at least 75% or other value) or a value associated with a user profile.

At block 912, method 900 may enable, by a notification platform, transmission of the notification to the device identifier associated with the target entity. For example, the notification may correspond to a mix of video, HTML-5, moving GIF notification, and display notifications. The size of the notifications may correspond to 320×50, 300×250, 728×90, 300×600, 480×320, 320×480, 160×600, 970×250, 970×90, or other values. The length of the video/moving notification may comprise 15 seconds, 30 seconds, or some other value. In some examples, the terms in the notification for the target entity may align with a background/attribute of the target entity from the user profile (e.g., jargon for the area of expertise or familiarity of the target entity). The notification may be matched to the device IDs that were previously determined.

Figure 10:
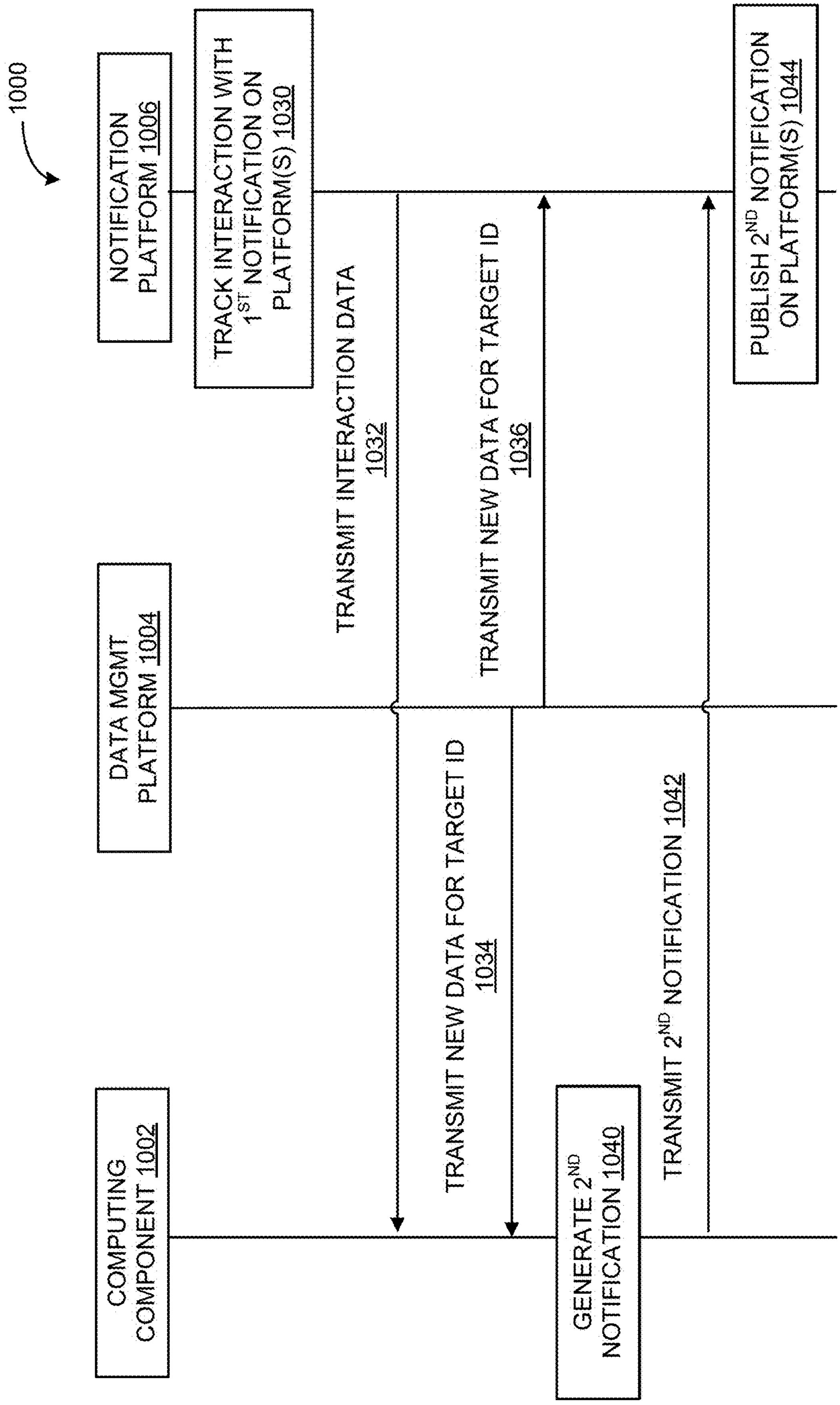
FIG. 10 illustrates a process for tracking interaction with a first notification and publishing a second notification, according to various aspects of the disclosed technology.

FIG. 10 illustrates a process for tracking interaction with a first notification and publishing a second notification, according to various aspects of the disclosed technology. In example 1000, computing component 1002, data management platform 1004, and notification platform 1006 are provided, according to various aspects of the disclosed technology. In this example, computing component 1002, data management platform 1004, and notification platform 1006 in FIG. 10 may correspond to computing component 210, data management platform 250, and notification platform 270 in FIG. 2, respectively.

At block 1030, notification platform 1006 may generate interaction data for the first notification published via the notification platform 1006. For example, the tracking may correspond to engagement/interactions with the notification (e.g., via click stream analysis, click through rate, liking, commenting, or sharing on social media, etc.) or measured through a poll/survey that questions the target entity or others about viewing or interacting with the notification.

At block 1032, notification platform 1006 may transmit the interaction data to computing component 1002.

At block 1034, data management platform 1004 may identify new data associated with the target entity. The new data may be transmitted to computing component 1002.

At block 1036, data management platform 1004 may also transmit the new data for the target entity to notification platform 1006.

At block 1040, computing component 1002 may generate a second notification. For example, the second notification may adjust the notification based on the interaction data or the new data for the target entity.

At block 1042, computing component 1002 may transmit the second notification to the notification platform 1006.

At block 1044, notification platform 1006 may publish the second notification on the notification platform 1006.

Figure 11:
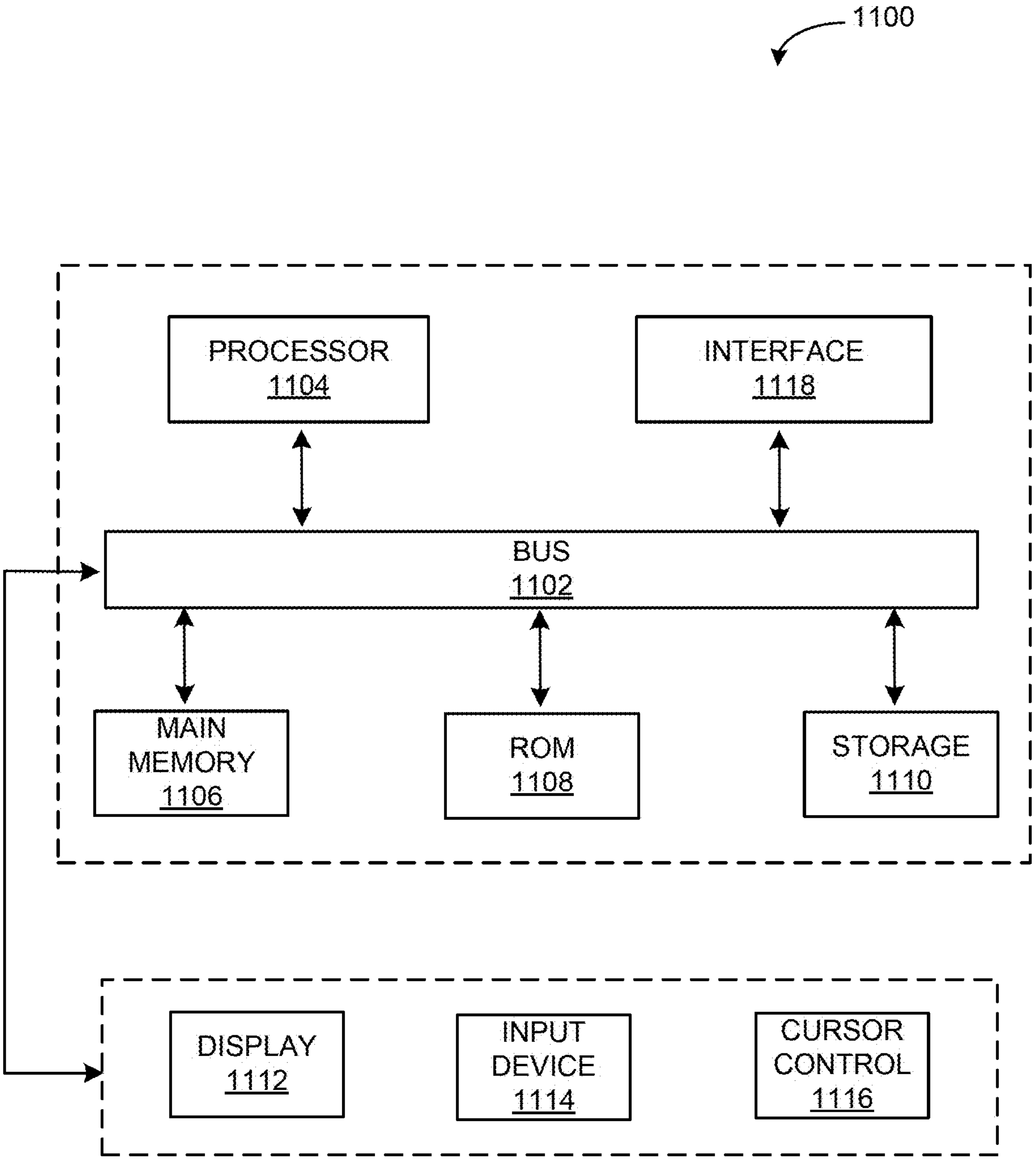
FIG. 11 depicts a block diagram of an example computer system in which various examples of the disclosed technology described herein may be implemented.

FIG. 11 depicts a block diagram of an example computer system 1100 in which various examples of the disclosed technology described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some examples, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one example of the disclosed technology, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes interface 1118 coupled to bus 1102. Interface 1118 provides a two-way data communication coupling to one or more network links that are connected to one or more local networks. For example, interface 1118 may be an integrated services digital network (ISDN) card, cable modem, satellite modem, or a modem to provide a data communication connection to a corresponding type of telephone line. As another example, interface 1118 may be a local area network (LAN) card to provide a data communication connection to a compatible LAN (or WAN component to communicate with a WAN). Wireless links may also be implemented. In any such implementation, interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 1118, which carry the digital data to and from computer system 1100, are example forms of transmission media.

The computer system 1100 can send messages and receive data, including program code, through the network(s), network link, and interface 1118. In the Internet example, a server might transmit a requested code for an application program through the Internet, the ISP, and interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing component comprising:
a processor; and
a non-transitory computer readable medium storing instructions that, when executed by the processor, cause the processor to:
receive a request to transmit a notification to a target entity, wherein the request comprises a non-unique identifier of the target entity, and wherein the target entity corresponds to a unique entity;
generate a user profile associated with the target entity;
update the user profile with an alias of the target entity;
determine a match rate value between the user profile for the target entity and the alias;
in response to the match rate value exceeding a match rate threshold, enable, by a data management platform, a determination of a device identifier ("device ID") for the user profile;
provide the notification to the notification platform without the device ID; and
enable, by a notification platform, transmission of the notification to the device ID associated with the target entity.

2. The computing component of claim 1, wherein the processor is further configured to:
determine a network entity of the non-unique identifier;
generate a second user profile associated with the network entity;
update the second user profile with second additional information about the network entity;
determine a second match rate value that compares information associated with the second user profile to itself;
in response to the second match rate value exceeding the match rate threshold, determine a second device ID for the second user profile; and
enable transmission of the notification to the second device ID associated with the network entity.

3. The computing component of claim 2, wherein the network entity and the target entity are listed together on a public-facing page or published official source.

4. The computing component of claim 1, wherein the processor is further configured to:
determine a notification dictionary for the target entity; and
generate the notification using terms from the notification dictionary.

5. The computing component of claim 1, wherein the target entity is identified in multiple, different authentication platforms or data stores across a distributed network.

6. The computing component of claim 1, wherein the match rate threshold is at least 75%.

7. The computing component of claim 1, wherein the notification is transmitted as a hash value or encrypted file to the notification platform.

8. A method comprising:
receiving a request to transmit a notification to a target entity, wherein the request comprises a non-unique identifier of the target entity, and wherein the target entity corresponds to a unique entity;
generating a user profile associated with the target entity;
updating the user profile with an alias of the target entity;
determining a match rate value between the user profile for the target entity and the alias;
in response to the match rate value exceeding a match rate threshold, enabling, by a data management platform, a determination of a device identifier ("device ID") for the user profile;
providing the notification to the notification platform without the device ID; and
after providing the notification to the notification platform without the device ID, enabling, by a notification platform, transmission of the notification to the device ID associated with the target entity.

9. The method of claim 8, further comprising:
determining a network entity of the non-unique identifier;
generating a second user profile associated with the network entity;
updating the second user profile with second additional information about the network entity;
determining a second match rate value that compares information associated with the second user profile to itself;
in response to the second match rate value exceeding the match rate threshold, determining a second device ID for the second user profile; and
enabling transmission of the notification to the second device ID associated with the network entity.

10. The method of claim 9, wherein the network entity and the target entity are listed together on a public-facing page.

11. The method of claim 8, further comprising:
determining a notification dictionary for the target entity; and
generating the notification using terms from the notification dictionary.

12. The method of claim 8, wherein the target entity is identified in multiple, different authentication platforms or data stores across a distributed network.

13. The method of claim 8, wherein the match rate threshold is at least 75%.

14. The method of claim 8, wherein the notification is transmitted as a hash value or encrypted file to the notification platform.

15. A non-transitory computer-readable storage medium storing a plurality of instructions executable by a processor, the plurality of instructions when executed by the processor cause the processor to:
receive a request to transmit a notification to a target entity, wherein the request comprises a non-unique identifier of the target entity, and wherein the target entity corresponds to a unique entity;
generate a user profile associated with the target entity;
update the user profile with an alias of the target entity;
determine a match rate value between the user profile for the target entity and the alias;

in response to the match rate value exceeding a match rate threshold, enable, by a data management platform, a determination of a device identifier ("device ID") for the user profile;

provide the notification to the notification platform without the device ID; and enable, by a notification platform, transmission of the notification to the device ID associated with the target entity.

16. The non-transitory computer-readable storage medium of claim 15, wherein the processor is further configured to:

determine a notification dictionary for the target entity; and generate the notification using terms from the notification dictionary.

17. The non-transitory computer-readable storage medium of claim 15, wherein the notification is transmitted as a hash value or encrypted file to the notification platform.

* * * * *